United States Patent [19]

Lentz

[11] 3,713,330
[45] Jan. 30, 1973

[54] AXLE TEST DEVICE
[75] Inventor: Thomas Phillip Lentz, Chanhassen, Minn.
[73] Assignee: MTS Systems Corp., Minneapolis, Minn.
[22] Filed: Jan. 11, 1971
[21] Appl. No.: 105,401

[52] U.S. Cl. .................................73/93, 73/100
[51] Int. Cl. ..................................G01n 3/08
[58] Field of Search ..........73/93, 88 R, 92, 100, 118, 73/91, 67.3, 71.7

[56] References Cited

OTHER PUBLICATIONS

J. D. Camp, "Random Load Fatique Test on Automotive Components & Structures"-ASTM-STP-476, pp. 46-58, publ. June, 1969.

*Primary Examiner*—Richard C. Queisser
*Assistant Examiner*—Arthur E. Korkosz
*Attorney*—Dugger, Peterson, Johnson & Westman

[57] ABSTRACT

An axle test device which will permit three input forces into the test specimen and which is primarily designed to be the front spindle or rear axle of an automobile or other vehicle, so that simulated testing can be carried out. The test device utilizes bell crank actuators which are designed to give a compact test stand without sacrificing performance and which are designed to compensate for cross coupling effects of movements in different planes.

6 Claims, 2 Drawing Figures

PATENTED JAN 30 1973

3,713,330

INVENTOR.
THOMAS P. LENTZ
BY
Dugger Peterson Johnson & Westman

AXLE TEST DEVICE

BACKGROUND OF THE INVENTION

1. Field of the Invention

The present invention relates to test stands for testing devices wherein force inputs in mutually perpendicular axes is desirable for testing.

2. Prior Art

Triaxial inputs into test axles under simulated road conditions is known in the art. For example, an article by J. D. Camp appearing in the American Society for Testing Materials Special Technical Publication No. 476, discloses a type of stand used for testing automobile front axles with three input forces. However, one of the problems involved in the device shown in the Camp article is that without complex linkages there is a cross coupling between the actuators so that, for example, if a vertical input is to be put in, there is a force change in the input of the longitudinal actuators because there has to be substantial movement of the vertical actuator. Consequently the arc of movement of this longitudinal actuator causes changes in forces on the test specimen axle. The Camp article discloses a "watts linkage" for the vertical input.

In addition, the actuators shown in test structure with the Camp device are extremely long, requiring a large amount of floor space for setting up the tests, and thus produce inefficiencies as well as cross coupling.

In this specification, "cross coupling" means that in a specimen system loaded along two axes when the load in one axis is changed the load along the other axis also changes because of the interconnecting of the loading devices.

SUMMARY OF THE INVENTION

The present invention relates to a test fixture for testing specimens which have forces introduced in three separate mutually perpendicular axes. The device provides compact bell crank arrangements which are arranged to reduce cross coupling forces along the input axes so that when the load is changed in one axis, there is no significant change in load in one of the other axes. This is provided for by utilizing bell crank type actuators which save space, and which for one of the axes can act along radii selected to provide automatic compensation for cross coupling between the forces applied to the respective axis.

DESCRIPTION OF THE PREFERRED EMBODIMENT

Figure 1:
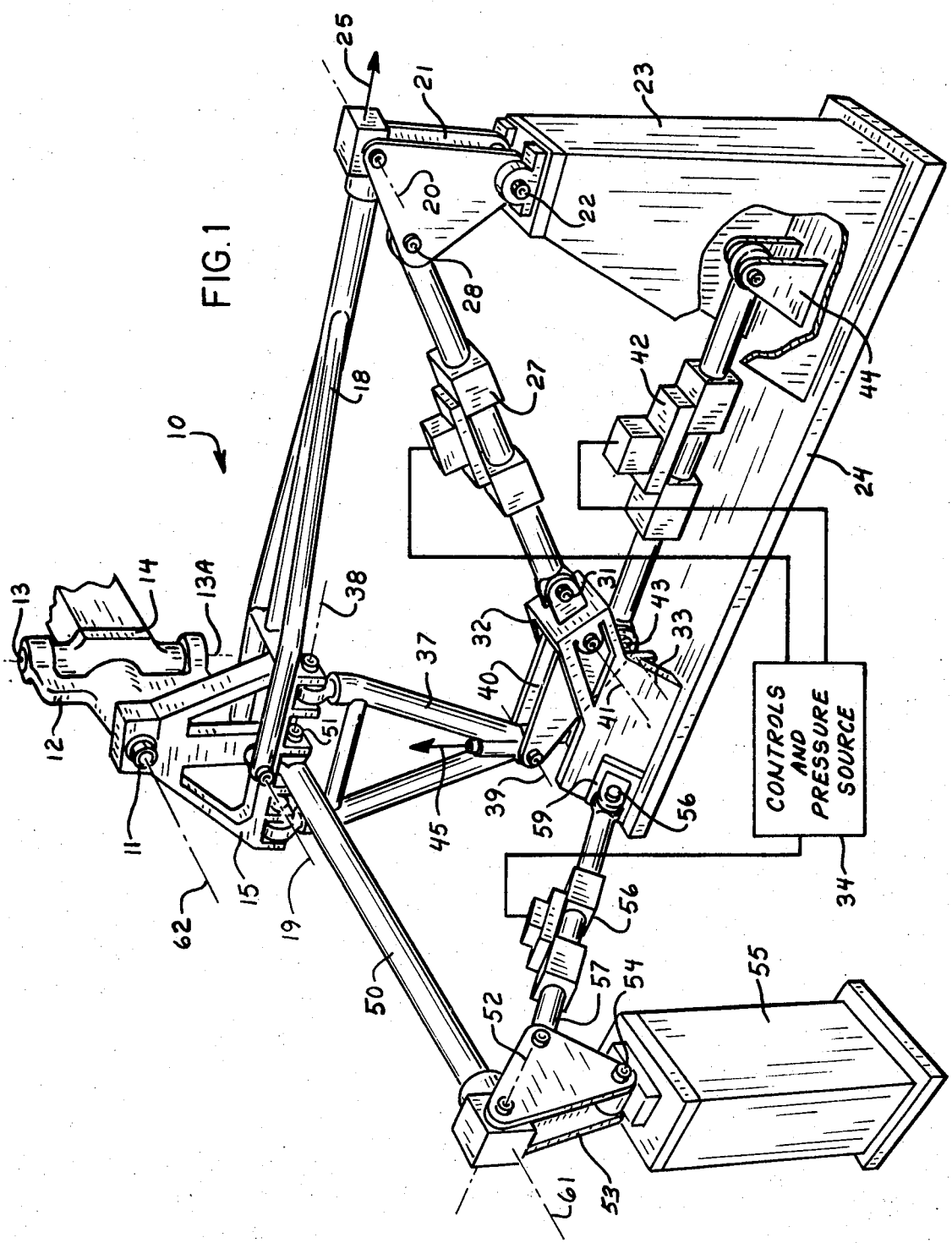
FIG. 1 is a perspective showing of a test stand made according to the present invention shown installed on a specimen and FIG. 2 is a schematic representation of the linkages used for loading in the vertical direction and in the fore and aft direction with the device of FIG. 1.

In the drawing, the device of the present invention is shown installed for testing a front wheel spindle of a automobile, which is primary usage of the present invention. The front axle may be left in place on the automobile while testing, which means it is spring mounted in vertical direction.

A test assembly illustrated generally at 10 is attached on a front wheel spindle 11 of an automobile which comprises the test specimen. As shown, the front spindle 11 is mounted onto a yoke 12, which is conventional in automobiles, and a king pin 13 extends through the conventional support 14 that is attached to a spring mounted front axle. A specimen load adapter illustrated generally at 15 is mounted onto the specimen, and is made so that it is pivotably mounted in the same manner that a wheel and tire on the spindle would be mounted for rotation. The steering axis of course is about the axis of the king pin 13 and is shown at 13A. The specimen adapter 15 is free to move about the axis of the spindle or specimen 11 except as constrained by the linkages attached thereto.

In order to test a front wheel spindle it is necessary to simulate the loads on the wheel. This includes the vertical force acting through the spindle, a fore and aft force, and a lateral force that comes from cornering. These forces can be reduced to components acting in three mutually perpendicular axes.

As shown, the fore and aft or longitudinal input is supplied through a longitudinal input link 18 that is pivotally mounted about an axis indicated at 19 to the specimen adapter 15, and is also pivotally mounted with a pin about an axis shown at 20 to a bell crank unit 21. The link 18 for the longitudinal input, as shown, has a yoke for attaching it to the specimen adapter 15, and a pin is used to connect it to the specimen adapter for movement about the axis 19. It should be noted that the bell crank assembly 21 comprises two parallel plates and the end of the link 18 is pivotally mounted between these plates. The bell crank 21 in turn is pivotally mounted with a pin 22 for movement about the axis of this pin to a pedestal 23 that is in turn attached to a frame 24. The frame 24 can be considered to be part of the main frame, and would be anchored to the floor or other structure for mounting the test stand.

The longitudinal input thus is along the axis of the link 18 illustrated at 25. Forces are applied in either direction of movement along this axis 25. The bell crank 21 is operated through the use of a linear hydraulic actuator 27 that is connected at 28 to one pivot point of the bell crank, which pivot point is spaced from the axis of the pin 22 and also spaced from the axis 20 of the pin connecting the link 18 to the bell crank assembly. The opposite end of the actuator 27 is connected as at 31 to a pair of ears that are mounted onto a plate 32 that in turn is supported with suitable supports illustrated at 33 back to the frame 24. The supports illustrated at 33 are spaced apart, and are also used to mount components for another bell crank assembly.

The hydraulic actuator 27 is controlled by servo valve controls from pressure sources and the controls are shown only schematically at 34. The servo valve in turn will supply fluid under pressure to suitable connections on the hydraulic actuator 27 so that the actuator can be extended in its longitudinal direction or retracted according to the control signals to put a moment into the bell crank 21 about axis of pin 22, and thereby apply load through the link 18 along axis 25.

The vertical input into the spindle 11 is provided with a wish bone shaped link 37, the outer ends of the two legs of the link 37 are pivotally mounted with suitable pins about an axis indicated at 38 to the adapter 15. The ends of the wish bone link 37 are of course pivotally mounted with these pins, and the legs are spaced apart along the axis 38 to provide stability of the link for loading the specimen in the longitudinal direction. The opposite end of the link 37 for the vertical input is pivotally mounted about an axis 39 to a bell crank assembly 40 that comprises a pair of spaced apart plates. The plates 40 are positioned between the upright columns of the supports 33 for the actuator 27, and are pivotally mounted with bearings about an axis indicated at 41 between these supports 33. The bell crank 40 is actuated with a hydraulic actuator 42 that has one end pivotally mounted as at 43 to the bell crank assembly 40 and the actuator 42 thus can put in an input through this pivotable mounting indicated at 43 to tend to pivot the bell crank about its axis 41. The opposite end of the actuator 42 is attached with suitable brackets 44 to the frame 24, and between the legs of the column 23.

The actuator 42 is also controlled by the control center 34 so that the actuator is supplied fluid under pressure through suitable servo valves in response to control signals. When the actuator 42 is expanded so that its length is elongated, it will tend to pivot the bell crank assembly 40 about its pivot axis 41, and this will then put a vertical load onto the specimen adapter in a vertical axis indicated at 45.

The vertical load along axis 45 will act on the spindle 11 through the adapter 15. This will put in a simulated vertical load just as a load on a front wheel in vertical direction is applied. Because of the spring mounting of the spindle, the amount of travel necessary to load the spindle is substantial, generally on the order of 10 inches.

The simulated lateral load on an auto wheel is supplied to the test specimen through a lateral link 50 that is pivotally mounted to the bracket 15 about the axis 38 with a suitable pin 51, and the opposite end of the lateral link 50 is pivotally mounted with a pin 50 and this pin has an axis 52. The pin at axis 52 is supported on a bell crank 53 that comprises a pair of spaced apart plates pivotally mounted with a pin 54 about an axis parallel to the axis 38 and the axis of the pin 52. The bell crank 53 is mounted onto a pedestal 55 that is attached to the floor or frame or other support structure, the same as the frame 24. The lateral force bell crank 53 is actuated with a hydraulic actuator 56 that is mounted with a pin 57 to the bell crank at position spaced from the axis of the pin 54 and also spaced from the axis 52. This actuator 56 has its opposite end mounted with a pin 58 to a bracket 59 also attached to the supports 33 and thus to the base 24. The actuator 56 is controlled from the control center 34 through suitable servo valves and fluid under pressure can be introduced into the hydraulic actuator 56 to create a moment on the bell crank 53 thus applying a lateral load along the axis of the link 50 which is indicated at 61. Therefore, there are three inputs provided to the specimen 11 along three mutually perpendicular axes, namely axes 25, 45, and 61.

It is desirable to prevent cross coupling between the input in the vertical direction, and the force input in the fore and aft or longitudinal direction. While bell cranks save space and make a compact unit unless properly arranged by selecting ratio of the length of links for these actuators severe cross coupling loads are possible. Because the bell crank 40 moves along an arc about its pivot axis 41 when a load is placed on the specimen 12 in direction of arrow 45, the bell crank axis 39 will also have a component of movement in the longitudinal direction, or in other words along the loading axis for link 18. If some compensation is not provided, this longitudinal component of movement of the axis 39 as the bell crank pivots will cause the load exerted by link 18 on the specimen to change because the link 18 and its associated actuator will resist movement of the link 37 and connected specimen adapter 15. The vertical movement necessary would cause, in a normal situation, a change in the longitudinal load to be applied because of the arc of movement of axis 39 which has a component of movement in the longitudinal direction, and the arc of movement of axis 19 about axis 20 which results when the link 18 is moved upwardly during the vertical loading of the specimen. However, in the present device, by properly selecting the ratio of the link lengths, this can be avoided. For example the distance between the axis 62 of the spindle 11 and the axis 19 is considered to be a distance equal to $a$, and the distance between the axis 39 and the axis 62 is set to be equal to $b$, and if the radius axis of the bell crank 40, for example between the axis of pin 41 and the axis 39 is $r$, the length of the link 18 between axis 20 and axis 19 is selected to be ($b/a$ times $r$). This ratio results in a movement of the link 37 at axis 19 which corresponds closely to the arcuate movement of link 18 about axis 20 and which permits the use of the bell crank without getting cross coupling. The bell cranks also conserve space and facilitate operating efficiency. The bell crank 40 moves in an arc about its axis 41, when force is applied in direction along 45 and this movement is compensated for by the change in position of the axis 19 as link 18 pivots about the axis 20 because of the arcuate movement of the link 18 when the link 37 and the test spindle move upwardly. This also provides for small motions of the spindle about the steering axis if desired during testing.

Also, note that axes 62, 19 and 39 lie in a common plane.

Figure 2:
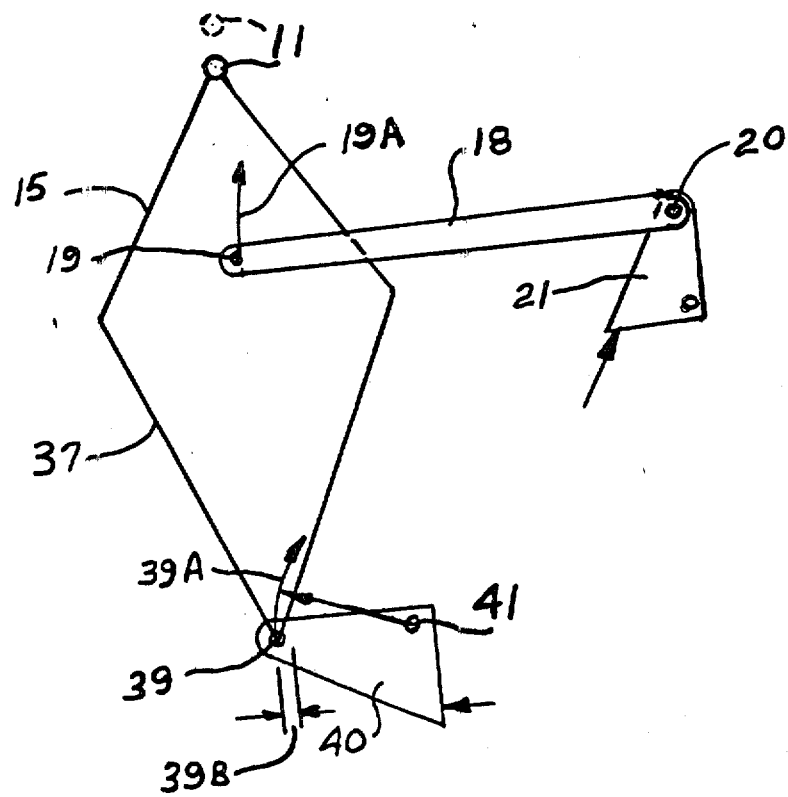

The simplified schematic diagram of FIG. 2 illustrates the linkage. Compensation for the cross coupling between the vertical and longitudinal is illustrated. The linkage 15, 37 is illustrated schematically, and spindle 11, axis 39, bell crank 40, bell crank pivot axis 41, link 18 and its connection axes 20 and 19 are also shown. It should be remembered that the bell crank actuator 21 is connected to the hydraulic actuator 27 which has noncompressible fluid in it.

As the bell crank 40 is pivoted to load in an upwardly direction, the pivot axis 39 moves along an arc corresponding to the radius of the lever arm of the bell crank. This arc is illustrated at 39A. When the spindle 11 moves upwardly as shown in dotted lines, the axis 39 of the bell crank has moved not only upwardly, but also in the fore and aft or longitudinal direction as indicated just for purposes of illustration by the parallel lines and double arrows 39B, a certain distance. As the spindle 11 has moved upwardly, the pivoting of the specimen adapter 15 about the spindle axis permits the entire link between axis 39 and the specimen 11 to move about the axis of the specimen 11 to accommodate this horizontal or longitudinal movement indicated by 39B. Therefore the axis 19 which is the connector axis for link 18 to adapter 15 also has moved upwardly and longitudinally in a compound motion. The link 18 which is a loading link, pivots about the axis 20, which may be assumed not to move because of the holding action of the actuator for the associated bell crank. Therefore the link 18 moves in an arc so that the connecting axis 19 which moves in an arc illustrated at 19A moves to a new position which is vertically higher, and is also moved horizontally or fore and aft as well.

It is apparent that if the arc of movement of axis 19 because of the movement of bell crank 40 does not substantially correspond to the arc of movement of the link 18 about its axis 20 the link 18 will either have to yield or to carry additional loads. In the normal situation, the movements are such that unless compensated the link 18 would increase in its load, and this is not desirable because this is the "cross coupling" effect that is not wanted. Therefore, by selecting the length of the link 18 between its pivot axis 20 and its axis 19, which determines the arc of movement of the link 18, at a desired ratio in respect to the overall length of the vertical loading link, the radius of actuation of the bell crank 40, and the position of the axis 19 in relation to the axis of the spindle 11, the movement of the bell crank 40 causes the axis 19 to move substantially along the arc described by the link 18 as it moves about its axis 20.

The usage illustrated is on a front wheel spindle, but rear axles also may be tested in the same manner. Of course, the axles of any vehicle may be tested, and the device is useful for testing specimens which require a substantial amount of movement in one axis of loading and simultaneous application of loads in another axis.

The load applying links 18 and 50 may be connected to their respective bell cranks and to the specimen adapter through suitable connecting devices which compensate for small amounts of misalignment. For example, at the bell crank end links 50 and 18 may be connected for movement about axes at right angles to axes 20 and 52, respectively, and at the specimen adapter, spherical seat connections such as rod ends may be used.

What is claimed is:

1. A compact means for loading a specimen in two substantially perpendicular force axes and designed to minimize cross coupling effects between devices loading the specimen, said specimen being mounted for movement along a first force direction of axis, a first linkage means including means to pivotally mount said first linkage means to said specimen on a first pivot axis, a pivotally mounted bell crank means pivotally coupled to said first linkage means, said bell crank having a bell crank arm of length equal to the distance between the pivotal mounting of the bell crank means and the pivotal coupling of the bell crank means to the first linkage means, a first force applying means pivotally connected to said bell crank means to load said first linkage means through said bell crank means, thereby enabling said first linkage means to apply a force to said specimen, said first linkage means being aligned so as to load and thereby move said specimen in the direction of said first force direction axis; a second force generating means including a loading member and a second linkage means pivotally connected to said loading member and to said first linkage means, said second force generating means enabling said second linkage means to apply a second force to said specimen, said second force being applied to said specimen along a force direction axis substantially perpendicular to the first force direction axis; said first linkage means being oriented to receive forces substantially perpendicular to its longitudinal axis lying along the first force direction axis without any substantial yielding in the direction of the received forces, and the relative length of said second linkage means being selected so as to be proportional to the length of the first linkage means and the distance between the pivotal connection of the first linkage means to said specimen, and the second linkage means pivot connection to the first linkage means and the length of the bell crank arm, thereby substantially avoiding cross coupling from the second linkage means when the specimen is loaded and moved by said first linkage means.

2. The device of claim 1 wherein said second loading member comprises a second pivotally mounted bell crank means, pivotally coupled to said second linkage means, and said second force generating means includes an actuator connected to said second bell crank means.

3. The combination as specified in claim 1 and a third link, means to apply force to said third link, said third link being coupled to apply force to said first linkage means along an axis substantially mutually perpendicular to the first and second force direction axes.

4. The device of claim 3 wherein said means to apply force to said third link comprises a third pivotally mounted bell crank means pivotally coupled to said third link, and third force generating means connected to the third bell crank means to load said third link.

5. The combination as specified in claim 1 wherein the pivot connection of said second linkage means to said first linkage means, the pivot connection of said first linkage means to the bell crank means, and the first pivot axis substantially lie in a plane.

6. A compact means for loading a specimen in two substantially perpendicular force axes and designed to minimize cross coupling effects between devices loading the specimen, said specimen being mounted for movement along a first force direction axis, a first linkage means including means to pivotally mount said first linkage means to said specimen on a first pivot axis, a pivotally mounted bell crank means having a bell crank arm pivotally coupled to said first linkage means, the distance between pivotal mounting of the bell crank means and the pivotal coupling the first linkage means being the length of the bell crank arm, a first force generating means connected to said bell crank means to load said first linkage means through said bell crank means, thereby enabling said first linkage means to apply a force to said specimen and to move said specimen along said first force direct axis; a second force generating means including a loading member and a second linkage means pivotally connected to said loading member and to said first linkage means, said second force generating means being operative to apply a second force to said specimen through said second linkage means, said second force being applied to said specimen along a force direction axis substantially perpendicular to the first force direction axis; said first linkage means being oriented to receive forces from said second linkage means substantially perpendicular to its longitudinal axis lying along the first force direction axis without any substantial yielding in the direction of the received forces, and the effective length of said second linkage means being selected so as to be substantially equal to the quantity $b/a$ times $r$, where the length of the first linkage means is $b$, and the distance between said first pivot axis and the second linkage means pivot connection to the first linkage means is $a$, and the length of the bell crank arm is $r$, thereby substantially avoiding cross coupling from the second linkage means when the specimen is loaded and moved by said first linkage means.

* * * * *

PO-1050
(5/69)

UNITED STATES PATENT OFFICE
CERTIFICATE OF CORRECTION

Patent No. 3,713,330            Dated January 30, 1973

Inventor(s) Thomas Phillip Lentz

It is certified that error appears in the above-identified patent and that said Letters Patent are hereby corrected as shown below:

In the drawings, add Figure 2 as shown on the attached sheet.

Column 1, line 55, after "specimen" add --;--. Column 5, line 53 (Claim 1, line 5), delete "of"; Column 5, line 57 (Claim 1, line 9), after "crank" add --means--. Column 6, line 24 (Claim 2, line 1), "second" should be deleted; Column 6, line 62 (Claim 6, line 17), "direct" should be --direction--.

Signed and sealed this 20th day of November 1973.

(SEAL)
Attest:

EDWARD M. FLETCHER, JR.　　　　　RENE D. TEGTMEYER
Attesting Officer　　　　　　　　Acting Commissioner of Patents